United States Patent
Hopkins et al.

(10) Patent No.: US 7,063,191 B2
(45) Date of Patent: Jun. 20, 2006

(54) REVERSED DECOUPLER ASSEMBLY FOR MR MOUNT

(75) Inventors: Patrick N. Hopkins, Farmington Hills, MI (US); Mark W. Long, Bellbrook, OH (US); Mark O. Bodie, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/775,399

(22) Filed: Feb. 10, 2004

(65) Prior Publication Data

US 2005/0173211 A1 Aug. 11, 2005

(51) Int. Cl.
*F16F 9/53* (2006.01)
(52) U.S. Cl. .............................. 188/267.2; 267/140.14
(58) Field of Classification Search ........... 267/140.14; 188/267, 267.1, 267.2
See application file for complete search history.

(56) References Cited

U.S. PATENT DOCUMENTS

| 4,861,006 | A | * | 8/1989 | Takano et al. | 267/140.14 |
| 4,925,162 | A | * | 5/1990 | Kojima | 267/140.13 |
| 5,029,823 | A | * | 7/1991 | Hodgson et al. | 267/140.14 |
| 6,412,761 | B1 | | 7/2002 | Baudendistel et al. | |
| 6,422,545 | B1 | | 7/2002 | Baudendistel et al. | |
| 6,485,005 | B1 | | 11/2002 | Tewani et al. | |
| 6,547,226 | B1 | | 4/2003 | Shores et al. | |

* cited by examiner

*Primary Examiner*—Xuan Lan Nguyen
(74) *Attorney, Agent, or Firm*—Michael D. Smith

(57) ABSTRACT

A hydraulic mount is provided having a body with first and second fluid chambers and a decoupler subassembly interposed between to partially define the first and second fluid chambers. The decoupler subassembly comprises first and second flexible decoupler members operatively sealed together to form a third fluid chamber. The first and second chambers may be substantially filled with a magneto-rheological fluid. The third chamber may be filled with a standard hydraulic fluid, like glycol.

6 Claims, 1 Drawing Sheet

REVERSED DECOUPLER ASSEMBLY FOR MR MOUNT

TECHNICAL FIELD

The present invention relates generally to hydraulic mounts for vehicles, and more particularly, to a magneto-rheological hydraulic mount having a reversed decoupler assembly.

BACKGROUND

Hydraulic mounts are standard pieces of equipment for isolating engine vibration relative to a vehicle frame. They typically include a reinforced, hollow rubber body that is closed by a resilient diaphragm so as to form a cavity. The cavity is separated into a pumping chamber and a diaphragm chamber by a plate. The pumping chamber is formed between the partition plate and the body. The diaphragm chamber is formed between the plate and the diaphragm. The chambers are in fluid communication through an orifice in the plate. Restricted fluid flow through the orifice caused by displacement inputs to the pumping chamber results in viscous damping.

Most modern hydraulic mounts include a decoupler to reduce damping and stiffness of the mount for small displacement inputs. The decoupler is a flexible barrier between the pumping chamber and the diaphragm chamber. Small vibrational inputs primarily deflect the decoupler such that the decoupler movements alone accommodate small volume changes in the two chambers. In this manner, fluid flow between the chambers is substantially avoided at certain small vibrational amplitudes such that hydraulic damping does not occur.

In some hydraulic mounts, the decoupler is trapped between two perforated metal plates. For larger inputs, the decoupler "bottoms out" against the plates, forcing fluid to flow through the orifice and increasing damping and stiffness. The mount displacement at which the decoupler bottoms out is sometimes referred to as the "initiation of damping."

Fluid in the holes of the perforated metal plates, together with the compliance of the mount's rubber body, form a resonant system. At frequencies above resonance, very little fluid will flow through the holes to the decoupler causing the decoupler to "choke off" and become ineffective. Accordingly, one objective in the design of a hydraulic mount is to make the frequency at which "choke off" occurs as high as possible. Ordinarily, this is accomplished by making the flow area of the holes, and therefore the area of the decoupler, as high as possible.

The disadvantage of increasing the area of the decoupler, however, is that for a given mount displacement input, a large area decoupler will undergo a physically smaller linear displacement than a small area decoupler. Therefore, to achieve the same "initiation of damping" a large area decoupler would need to be trapped between plates with more tightly controlled freeplay dimensions, which increases manufacturing costs.

The performance of hydraulic mounts can be improved through the use of magneto-rheological ("MR") fluids. By subjecting these fluids to a magnetic field their flow characteristics can be altered to actively control fluid damping. Hydraulic mounts using MR fluid ("MR mounts") typically use a fluid that is 2.4 times more dense than the hydraulic fluid used in standard hydraulic mounts. Consequently, to achieve the same "choke off" frequency as a standard hydraulic mount an MR mount would need a decoupler that is roughly 2.4 times larger in area. To achieve the same "choke off" frequency the freeplay dimensions of the decoupler would also need to be controlled 2.4 times more tightly. Accordingly, in the "choke off" frequency vs. manufacturing tolerance tradeoff, an MR mount with its denser working fluid is always at a disadvantage when compared to a standard hydraulic mount.

The object of the present invention is to provide a new MR mount that overcomes the these disadvantages by utilizing a lower density fluid as the working fluid for the decoupler.

SUMMARY

According to a first aspect, a hydraulic mount is provided having a body with first and second fluid chambers and a decoupler subassembly interposed between to partially define the first and second fluid chambers. The decoupler subassembly comprises first and second flexible decoupler members operatively sealed together to form a third fluid chamber. The first and second chambers may be substantially filled with a magneto-rheological fluid. The third chamber may be filled with a standard hydraulic fluid, like glycol.

According to a second aspect, a decoupler sub-assembly for a hydraulic mount is provided. The decoupler sub-assembly comprises first and second flexible decoupler members that are operatively sealed together to form a fluid chamber. A perforated plate is interposed between the first and second decoupler members in the fluid chamber and a hydraulic fluid is located in the fluid chamber. The hydraulic fluid may be glycol.

DETAILED DESCRIPTION

Figure 1:
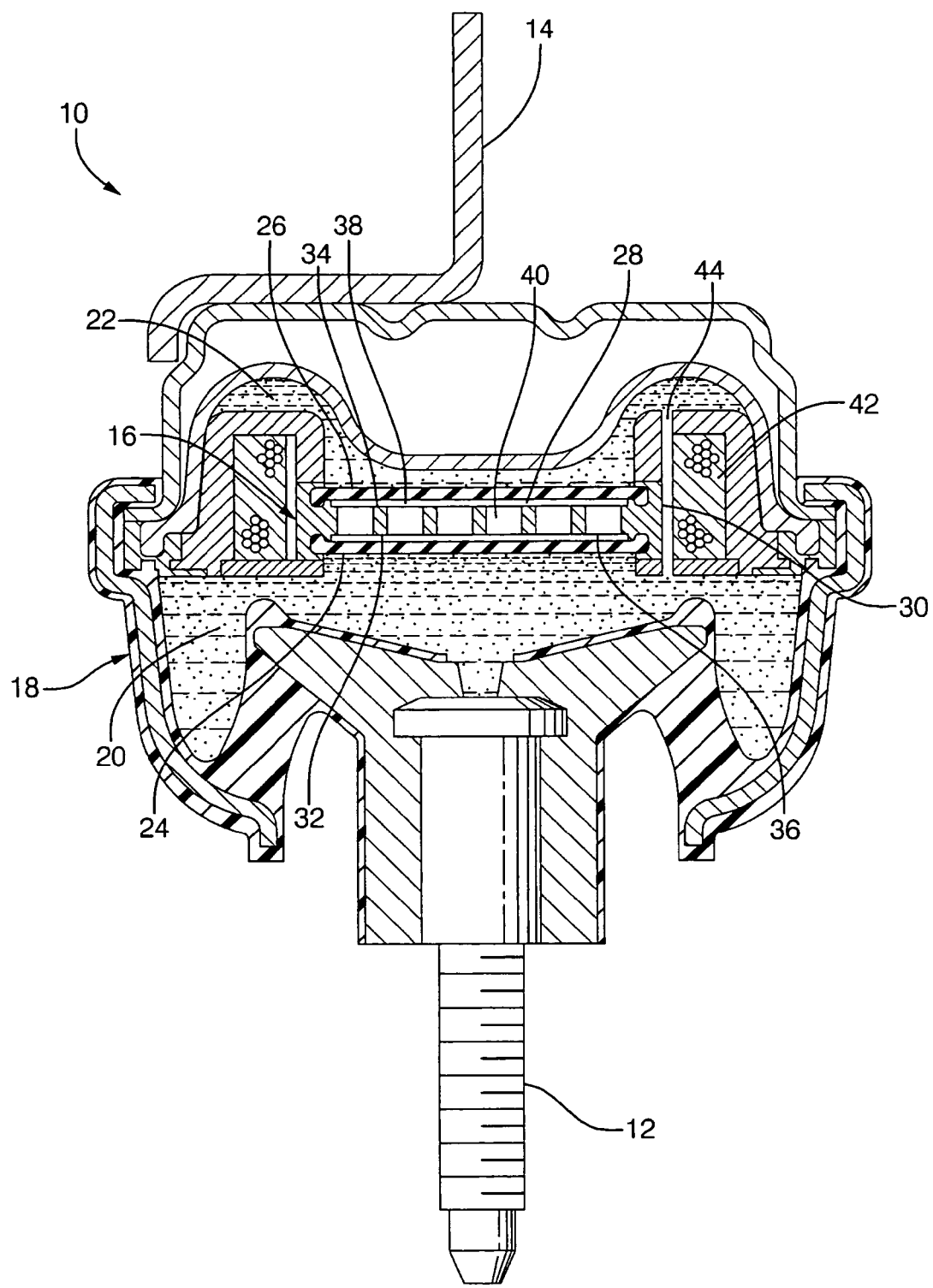
FIG. 1 is a cross-section of an MR mount according to one aspect having a reversed decoupler assembly.

A hydraulic mount 10 for mounting an engine (not shown) to a vehicle frame (not shown) is shown in FIG. 1. In the embodiment that is shown the hydraulic mount 10 is a hanging mount that includes a first mounting member 12 for securing the hydraulic mount 10 to the engine and a second mounting member 14 for hanging the engine and hydraulic mount 10 from the vehicle frame. In another embodiment that is not shown the engine may sit on top of the hydraulic mount 10, which in turn sits on top of the vehicle frame. The function of the disclosed hydraulic mount is the same regardless of engine position and the depiction of a hanging mount is in no way intended to limit the scope of the invention.

Referring again to FIG. 1, the hydraulic mount 10 further comprises a decoupler sub-assembly 16 and a body 18 having a first fluid chamber 20 and a second fluid chamber 22. The first fluid chamber 20 may be referred to herein as the pumping chamber and the second fluid chamber 22 may be referred to as the diaphragm chamber. The body 18 may be formed from a flexible, molded elastomer, as taught in U.S. Pat. Nos. 6,485,005 and 6,412,761, such that vibrational inputs from the engine may elastically deform the body 18. The first fluid chamber 20 and the second fluid chamber 22 may be in fluid communication such that compression of the pumping chamber 20 may cause fluid transfer between the first and second fluid chambers 20, 22 for viscous damping.

The decoupler sub-assembly 16 is interposed between and partially defines the first and second fluid chambers 20, 22 so that fluid in the first and second fluid chambers 20, 22 can exert pressure directly on the decoupler sub-assembly 16. In a first embodiment, the decoupler sub-assembly 16 comprises first and second flexible decoupler members 24, 26 that are operatively sealed together to form a third fluid chamber 28. The decoupler sub-assembly 16 may further comprise a perforated plate 30 interposed between the first and second decoupler members 24, 26 in the third fluid chamber 28. As with a conventional decoupler assembly, small vibrational inputs primarily deflect the decouplers 24, 26 to accommodate small volume changes in the two chambers 20, 22. In this manner, hydraulic damping does not occur at certain small vibrational amplitudes.

The first and second decoupler members 24, 26 may be mounted parallel to the perforated plate 30. Additionally, the first and second decoupler members 24, 26 may be spaced away from first and second sides 32, 34 of the perforated plate 30, respectively, to form first and second spaces 36, 38 therebetween. The perforated plate includes at least one path 40 in fluid communication with the first and second spaces 36, 38. The sizes of the first and second spaces 36, 38 may be selected so as to limit the deflection of the first and second decoupler members 24, 26, respectively. Significantly, however, the "initiation of damping" for the new reversed decoupler arrangement is not controlled by the thickness of the flexible rubber parts but rather by the relationship of the decoupler assembly fill volume to the volume of the holes in the perforated plate 30. Accordingly, the manufacturing tolerances for the new decoupler sub-assembly 16 are no tighter than in conventional decoupler assemblies.

Referring again to FIG. 1, the hydraulic mount 10 that is shown is an MR mount having an MR fluid located in the first and second fluid chambers 20, 22 and a coil 42 that is operable to produce an electromagnetic field in the body 18 when energized. A passage 44 through the decoupler sub-assembly 16 connects the first and second fluid chambers 20, 22 to permit the MR fluid to pass therebetween.

To overcome the disadvantages of using a denser MR fluid as the working fluid of the hydraulic mount, the new decoupler sub-assembly 16 uses a lower density fluid in the third fluid chamber 28. Specifically, the fluid contained in the third fluid chamber 28 of the decoupler sub-assembly 16 may be glycol or any comparable fluid typically used in hydraulic mounts. With the use of a typical, low density hydraulic fluid in the decoupler sub-assembly 16, the MR mount is able to match the high-frequency performance of a conventional hydraulic mount without an increase in decoupler area or a tightening of tolerances. Additionally, because the new decoupler sub-assembly 16 is configured as a self-contained unit having a small trapped volume of a separate working fluid, it can be assembled and filled off-line before insertion into the hydraulic mount 10.

The invention claimed is:

1. A hydraulic mount comprising:
a body having a first fluid chamber and a second fluid chamber;
a decoupler sub-assembly interposed between and partially defining the first and second fluid chambers, the decoupler sub-assembly comprising first and second flexible decoupler members operatively sealed together to form a third fluid chamber;
a first fluid located in the first and second fluid chambers; and
a second fluid located in the third fluid chamber;
wherein the first fluid comprises a magneto-rheological fluid; and
wherein the second fluid comprises glycol.

2. A hydraulic mount as claimed in claim 1, wherein the decoupler sub-assembly further comprises a perforated plate interposed between the first and second decoupler members in the third fluid chamber.

3. A hydraulic mount comprising:
a body having a first fluid chamber and a second fluid chamber;
a magneto-rheological fluid located in the first and second fluid chambers; and
a decoupler sub-assembly interposed between and partially defining the first and second fluid chambers, the decoupler sub-assembly comprising:
first and second flexible decoupler members operatively sealed together to form a third fluid chamber;
a perforated plate interposed between the first and second decoupler members in the third fluid chamber;
a passage in fluid communication with the first fluid chamber and the second fluid chamber such that the magneto-rheological fluid can pass between the first and second fluid chambers;
a coil that is operable to produce an electromagnetic field across the passage when energized; and
a hydraulic fluid located in the third fluid chamber.

4. A hydraulic mount as claimed in claim 3, wherein the first and second decoupler members are mounted parallel to the perforated plate on the decoupler sub-assembly, wherein the first decoupler member is spaced away from a first side of the perforated plate to form a first space therebetween and wherein the second decoupler member is spaced away from a second side of the perforated plate to form a second space therebetween.

5. A hydraulic mount as claimed in claim 4, wherein the perforated plate includes a path in fluid communication with the first and second spaces.

6. A hydraulic mount as claimed in claim 4, wherein the first decoupler member is spaced away from the perforated plate such that the first side of the perforated plate will limit the deflection of the first decoupler member.

* * * * *